United States Patent
Pupalaikis et al.

(10) Patent No.: US 10,147,000 B2
(45) Date of Patent: Dec. 4, 2018

(54) MANNED UNMANNED TEAMING (MUM-T) SYSTEM TO TRANSFORM IMAGE DATA BASED ON GEOGRAPHIC ORIENTATION

(71) Applicant: Sikorsky Aircraft Corporation, Stratford, CT (US)

(72) Inventors: Robert Pupalaikis, Palm Beach Gardens, FL (US); James S. Magson, North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 51 days.

(21) Appl. No.: 15/266,886

(22) Filed: Sep. 15, 2016

(65) Prior Publication Data
US 2017/0076159 A1 Mar. 16, 2017

Related U.S. Application Data

(60) Provisional application No. 62/218,775, filed on Sep. 15, 2015.

(51) Int. Cl.
*G06K 9/00* (2006.01)
*G06T 7/00* (2017.01)
(Continued)

(52) U.S. Cl.
CPC ........ *G06K 9/00791* (2013.01); *B64C 39/024* (2013.01); *B64D 47/08* (2013.01);
(Continued)

(58) Field of Classification Search
CPC ............... G05D 1/0011; G05D 1/0094; G06K 9/00791; G06K 9/6201; G06K 9/4671;
(Continued)

(56) References Cited

U.S. PATENT DOCUMENTS 6,130,705 A 10/2000 Lareau et al.
6,166,679 A * 12/2000 Lemelson ............. G01S 5/0009
342/357.57

(Continued)

OTHER PUBLICATIONS

Image Fig. 1, 2015, Image retrieved on May 8, 2018, retrieved from url:<https://www.google.com/search?hl=en&biw=1307&bih=1678&tbm=isch&sa=1&ei=yJj1WpLjlKfr5gK08r6QCQ&q=%22How+much+money+will+spend+Romania+for+unmanned+airplanes%E2%80%9D&oq=%22How+much+money+will+spend+Romania+for+unmanned+airplanes%E2%80%9D&gs_l=img.3 . . . 7802.>.*

(Continued)

*Primary Examiner* — Gregory F Cunningham
(74) *Attorney, Agent, or Firm* — Cantor Colburn LLP (57) ABSTRACT

A manned unmanned teaming (MUM-T) image system includes an unmanned vehicle (UV) configured to travel in a first heading and includes at least one sensor configured to capture at least one image having a first visual orientation pursuant to the first heading. The MUM-T image system generates image data indicative of the at least one image. A manually operated vehicle (MOV) in signal communication with the UV is configured to travel in a second heading. The MOV comprises an electronic image transformation module configured to receive the image data and to transform the image data into a second orientation different from the first orientation based on the second heading. An electronic display unit is configured to receive the transformed image data and to display the at least one image according to the second orientation.

20 Claims, 5 Drawing Sheets

(51) Int. Cl.
*G06T 11/60* (2006.01)
*G06K 9/62* (2006.01)
*B64C 39/02* (2006.01)
*B64D 47/08* (2006.01)
*G05D 1/00* (2006.01)
*G06T 3/00* (2006.01)
*G06K 9/46* (2006.01)

(52) U.S. Cl.
CPC ......... *G05D 1/0011* (2013.01); *G05D 1/0094* (2013.01); *G06K 9/6201* (2013.01); *G06T 3/0006* (2013.01); *G06T 7/004* (2013.01); *G06T 11/60* (2013.01); *B64C 2201/123* (2013.01); *G06K 9/4671* (2013.01); *G06K 2009/4666* (2013.01)

(58) Field of Classification Search
CPC . G06K 2009/4666; G06T 7/004; G06T 11/60; G06T 3/0006; B64C 39/024; B64C 2201/123; B64D 47/08
USPC .......................................................... 382/104
See application file for complete search history.

(56) References Cited

U.S. PATENT DOCUMENTS

| | | | |
|---|---|---|---|
| 6,549,162 B1* | 4/2003 | Gage | H04B 7/18508 342/353 |
| 6,563,457 B2* | 5/2003 | Chang | G01S 5/0054 342/353 |
| 7,911,497 B2 | 3/2011 | Russell et al. | |
| 9,207,864 B2* | 12/2015 | Funabashi | G06F 3/04886 |
| 2009/0138233 A1* | 5/2009 | Kludas | G01C 15/00 702/158 |
| 2012/0200703 A1* | 8/2012 | Nadir | G02B 27/644 348/144 |
| 2013/0050487 A1 | 2/2013 | Omer et al. | |
| 2014/0257596 A1 | 9/2014 | Paulsen et al. | |
| 2014/0267723 A1 | 9/2014 | Davidson, Jr. et al. | |
| 2015/0172567 A1* | 6/2015 | Ekeroth | H04N 5/332 348/82 |

OTHER PUBLICATIONS

Reference U is imbedded in office action as Fig. 1.*

* cited by examiner

MANNED UNMANNED TEAMING (MUM-T) SYSTEM TO TRANSFORM IMAGE DATA BASED ON GEOGRAPHIC ORIENTATION

CROSS-REFERENCE TO RELATED APPLICATIONS

The present invention claims priority to U.S. Provisional Application Ser. No. 62/218,775, filed Sep. 15, 2015, the contents of which are incorporated herein by reference in their entirety.

TECHNICAL FIELD

Various embodiments relate generally to aircraft display system, and more particularly, to manned unmanned teaming (MUM-T) systems.

BACKGROUND

Current trends in military aircraft platforms is the implementation of human machine interfaces (HMIs) in which manually operated aircrafts leverage an unmanned aircraft system (UAS) of one or more unmanned aerial vehicles (UAVs) to enhance periphery and/or weapons capabilities. One such HMI is a manned unmanned teaming (MUM-T) system capable of extending video sensor coverage in time and space. The MUM-T system also provides additional capability for aircrew to manually reconnoiter forward areas of interest (AOI) to achieve enhanced aircrew situational awareness, greater lethality, and improved aircraft survivability. As one or more UAS sensors stream real-time video to a digital cockpit of the manually operated aircraft, the aircrew can control the UAS sensors similar to those on board the manually operated aircraft.

During operation, however, the UAV flight path can become offset from the AOI at prescribed radii which can result in continuous rotation and/or movement of the streamed video displayed on the multi-function display (MFD) of the manually operated aircraft. Further, the continuous rotation typically causes the video displayed on the MFD to have a different orientation with respect to the current heading of the manually operated aircraft. Consequently, the rotating and continuously changing/moving orientation of the UAS video requires the aircrew to commit a significantly higher workload to maintain target tracking, thereby contributing to reduced overall situational awareness.

SUMMARY

According to embodiment, a manned unmanned teaming (MUM-T) image system comprises an unmanned vehicle (UV) configured to travel in a first heading and includes at least one sensor configured to capture at least one image having a first visual orientation pursuant to the first heading. The MUM-T image system generates image data indicative of the at least one image. A manually operated vehicle (MOV) in signal communication with the UV is configured to travel in a second heading. The MOV comprises an electronic image transformation module configured to receive the image data and to transform the image data into a second orientation different from the first orientation based on the second heading. An electronic display unit is configured to receive the transformed image data and to display the at least one image according to the second orientation;

In addition to one or more of the features described above or below, or as an alternative, further embodiments include the following features:

a system wherein the display unit displays the at least one image according to the second orientation irrespective of the first heading of the UV;

a system wherein the UV generates UV navigation data indicating at least one of a current location and a current heading of the UV, and wherein the image transformation module transforms the image data based on a comparison between the first heading and the second heading;

a system wherein the image transformation module continuously transforms the orientation of the at least one image such that the second orientation continuously matches the second heading of the MOV;

a system wherein the MOV includes a UV input device configured to input at least one command to control the at least one sensor, and wherein the image transformation module determines at least one directional input applied to the input device and translates the at least one directional input into a sensor position command that adjusts a position of the at least one sensor based on the second heading of the MOV;

a system wherein the sensor position command adjusts the at least one sensor independently from a physical direction received by the at least one directional input;

a system wherein the at least one directional input includes slew up, slew down, slew port side, and slew starboard side;

a system wherein the UV is an unmanned aerial vehicle (UAV); and a system wherein the at least one image is a streamed video captured in real-time.

In addition to one or more of the features described above or below, or as an alternative, further embodiments include an image translation system installed on a manually operated vehicle (MOV). The image translation system comprises a MOV navigation system configured to determine a current heading of the MOV and an electronic image transformation module configured to receive image data indicative of at least one image captured in a first orientation by at least one sensor installed on an unmanned vehicle (UV). The image translation system transforms the image data into a second orientation corresponding to the current heading of the MOV. An electronic display unit is configured to receive the transformed image data and to display the at least one image according to the second orientation;

In addition to one or more of the features described above or below, or as an alternative, further embodiments include the following features:

a system wherein a UV input device is configured to input at least one command to control the at least one sensor, and wherein the image transformation module determines at least one directional input applied to the input device and translates the at least one directional input into a sensor position command that adjusts a position of the at least one sensor based on the second heading of the MOV; and a system wherein the sensor position command adjusts the at least one sensor independently from a physical direction received by the at least one directional input.

According to another non-limiting embodiment, a method of displaying at least one image captured by an unmanned vehicle (UV) comprises capturing at least one image having a first orientation using at least one sensor installed on the UV, and determining a first heading of the UV at the time of capturing the at least one image. The method further comprises generating image data indicative of the at least one image having the first orientation pursuant to the first heading, and transmitting the image data to at least one manually operated vehicle (MOV). The method further comprises determining a second heading of the MOV and transforming the image data into a second orientation different from the first orientation based on the second heading. The method further comprises displaying the at least one image according to the second orientation on an electronic display unit;

In addition to one or more of the features described above or below, or as an alternative, further embodiments include the following features:

displaying the at least one image according to the second orientation irrespective of the first heading of the UV;

generating UV navigation data indicating at least one of a current location and a current heading of the UV, and transforming the image data based on a comparison between the first heading and the second heading;

continuously transforming the orientation of the at least one image such that the second orientation continuously matches the second heading of the MOV;

inputting at least one command to control the at least one sensor, determining at least one directional input applied to the input device and translating the at least one directional input into a sensor position command so as to adjust a position of the at least one sensor based on the second heading of the MOV;

adjusting the at least one sensor independently from a direction received by the at least one directional input;

a method wherein the at least one directional input includes slew up, slew down, slew port side, and slew starboard side; and a method wherein the UV is an unmanned aerial vehicle (UAV), and wherein the at least one image is a streamed video captured in real-time.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Various embodiments of the invention implement a transformation to the streamed UAS video from an unmanned vehicle (UV) to a manually operated aircraft that presents a constant (non-rotating/non-moving) video in 'NORTH—UP, 'TRACK—UP', or operator selectable orientation, each of which is independent of the current heading or orientation of the UV. In addition, at least one embodiment implements a transformation into the video stream relayed by the UAS that enables the aircrew to operate a Multi Force Slew Controller (MFSC) that can manually slew the UAS video up (UP), down (DN), port side (PS)—i.e., left, and starboard side (SB)—i.e., right, while retaining the desired mechanical characteristics of the MFSC. The UP and DN slew directions occur along a manually selected orientation, and PS and SB slew directions occur independent of the cardinal directional heading of the MOV. Accordingly, carefree and intuitive sensor slew control can be achieved to facilitate systematic and efficient reconnaissance of one or more areas of interest thereby increasing overall situational awareness.

Figure 1:
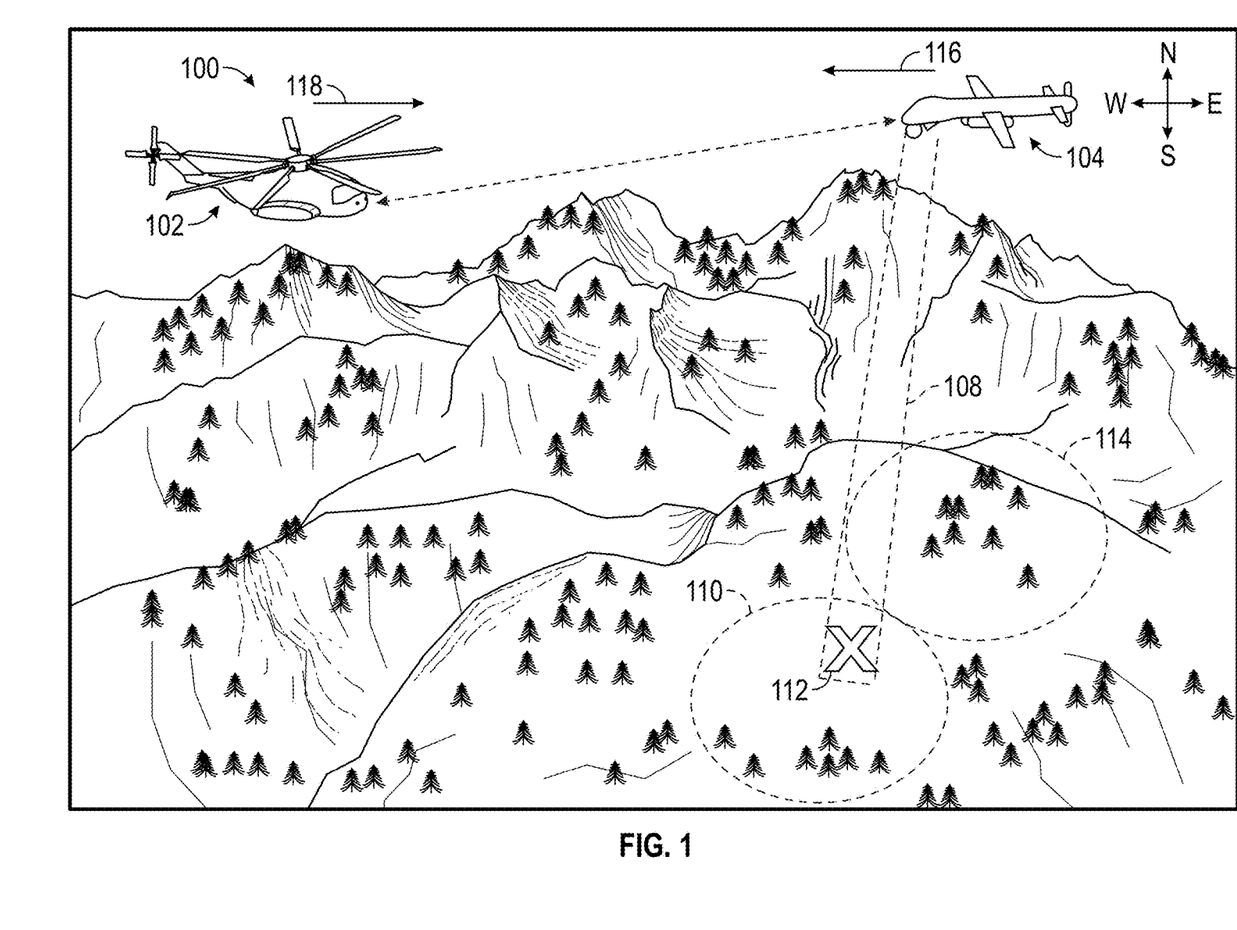
FIG. 1 is a block diagram of a manned unmanned teaming (MUM-T) system according to a non-limiting embodiment.

Turning now to FIG. 1, a block diagram of a manned unmanned teaming (MUM-T) system 100 is illustrated according to a non-limiting embodiment. The MUM-T system 100 includes a manually operated vehicle (MOV) 102 (also referred to herein as "manned vehicle (MV)") in signal communication with an unmanned vehicle (UV) 104. In this manner, the UV 104 can relay a UAS video stream to the MOV 102 as described in greater detail below. According to an embodiment, the UV is an unmanned aerial vehicle (UV), but is not limited there to. For example, the UV 104 may include, but is not limited to, an unmanned surface vehicle (USV), an unmanned ground vehicle (UGV), and an unmanned underwater vehicle (UUV). The MOV 102 may include any MOV capable of establishing signal communication with the UV 104.

The UV 104 includes one or more image sensors 106 such as, for example, a video camera. The sensor 106 has a field of view (FOV) 108 and is configured to monitor an area of interest (AOI) 110 such as a landing/evacuation zone of the MOV 102, or a combat zone, and one or more targets 112 located within the AOI 110 while the UV 104 travels along a monitoring path 114, e.g., a flight path 114. Although the manually operated vehicle 102 is illustrated as being in the vicinity of the AOI 110, the AOI 110 may be located outside the peripheral range of the MOV 102.

The MOV 102 and the UV 104 are configured to establish a handover communication session between one another. According to a non-limiting embodiment, the UV 104 electrically communicates a real-time captured image of the AOI 110 via a wireless data connection such as, for example, a tactical data link. In this manner, crew members of MOV 102 have visual access of the AOI 110 thereby extending the line of sight of the crew members' eyes beyond peripheral range provided by conventional sensors of the MOV 102.

In addition to the real-time captured image, the UV 104 electrically communicates its current position and/or a current UV heading 116 to the MOV 102. The current UV heading may then be compared to a current heading 118 of the MOV 102, and the real-time captured image is transformed based on the comparison to improve the pilot or other crewmembers' visual comprehension. For instance, the MOV 102 may have a current heading 118 due east with the intention to rendezvous at an AOI 110. While traveling toward the AOI 110, the MOV 102 receives a real-time captured image of one or more targets 112 from the UV 104 having a current UV heading 116 due west. A conventional real-time captured image in this case will essentially appear as a mirror image to the crewmembers of the MOV 102 (see FIGS. 2A-2B). However, at least one embodiment of the disclosure transforms the orientation of the real-time captured image to match the current heading of the MOV 102 (see FIGS. 3A-3B). Accordingly, the visual comprehension of the pilot or crew is improved and one or more of the crewmembers may adjust the position of the UAS in a more natural and intuitive manner.

Figure 2:
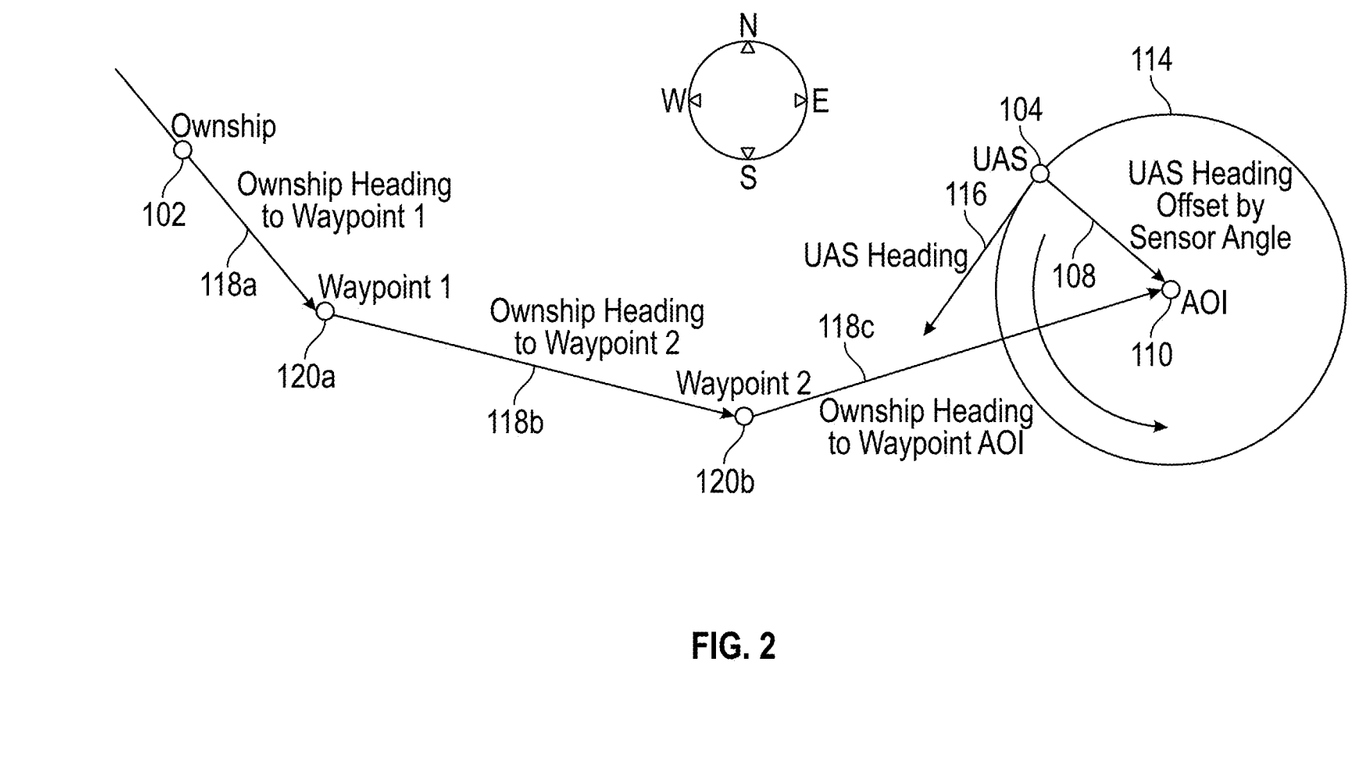
FIG. 2 is a diagram illustrating a manually operated vehicle traversing along a path defined by a series of waypoints toward an area of interest (AOI) monitored by a continuously moving unmanned vehicle (UV)

Referring to FIG. 2, a diagram illustrates the directional orientation of a manually operated vehicle 102 traversing along a route defined by a series of waypoints 120a-120b toward an AOI 110. The AOI 110 is monitored by an unmanned vehicle (UV) 104 that continuously travels counterclockwise along a monitoring path 114. Consequently, the MOV headings 118a-118c and the UV heading 116 are constantly changing with respect to the UAS FOV 108. In terms of the perspective a real-time captured image by the UV, the exact orientation of the AOI shown in the real-time captured image may not be fully clear to the pilot or crew with respect to the current heading of the MOV 102 prior to transforming the orientation of the real-time captured image. For instance, the UV heading 116 may be facing the direct direction with respect to the MOV heading 118a at waypoint 1 (120a), whereas the UV heading 116 may be facing the same direction of the heading 118 of the MOV 102 at waypoint 2 (120b).

The translated orientation of the real-time captured image is determined, for example, as a difference between a current heading 118a-118c of the MOV and a current UV heading 116. According to an embodiment, a current offset corresponding to the orientation of the FOV 108 may be included to more precisely translate the real-time captured image into an orientation corresponding to the perspective of the current MOV heading 118a-118c. A Hough transformation, Scale-invariant feature transformation (SIFT), or other well-known orientation algorithms may be utilized to translate the orientation real-time image with respect to the MOV 102. Alternatively, the current GPS coordinates and heading of the UV 104 can be transmitted to the MOV 102. Once the translated orientation of the real-time captured image is determined, the image can be transformed using a pixel orientation algorithm as understood by one of ordinary skill in the art. These GPS coordinates can then be transformed into pixel coordinates using various Mercator-based projection algorithms before being reoriented to match the current heading of the MOV 102.

Figure 3A:
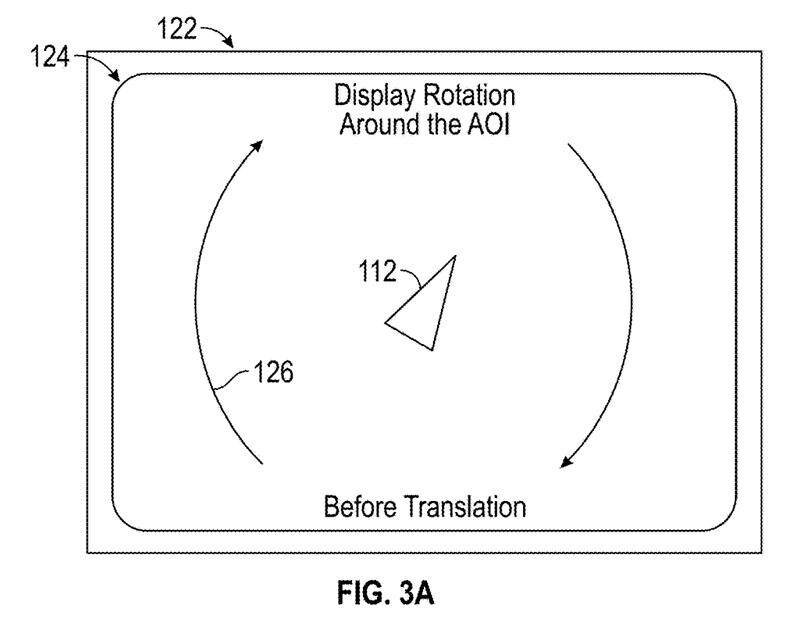
FIGS. 3A-3B illustrate a multi-function display (MFD) installed on a manually operated vehicle traveling along a current ownership head and showing an orientation of a video streamed by a continuously moving UV monitoring an area of interested prior to translating an orientation of the video stream.
Figure 3B:
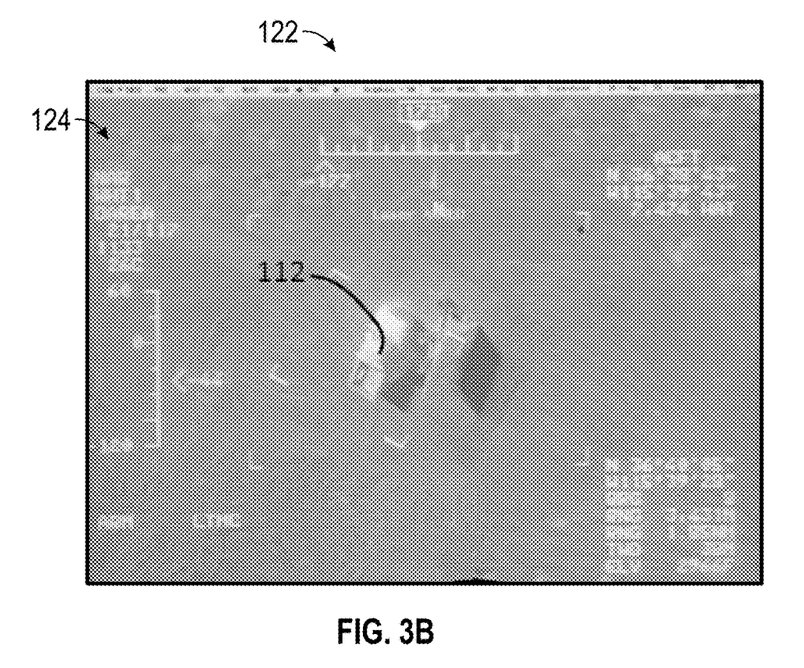

Referring to FIGS. 3A-3B, for example, an electronic display unit such as, for example, a multi-function display (MFD) 122 installed on the MOV 102 illustrates a real-time captured image 124 prior to performing an image orientation transformation. In this example, the MOV 102 is currently heading to waypoint 2 and with a current MOV heading 118b of southeast. As indicated by the clockwise arrows 126, the image 124 of the MFD 122 constantly rotates while the UV 104 continuously travels along the monitoring path 114 to capture the AOI 110. Consequently, the orientation of the target 112 and/or other objects in the captured image with respect to the MOV 102 may be unclear to the crewmembers as the MOV 102 travels toward the AOI 110. Further, a sense of disorientation may be realized by the MOV crewmembers when attempting to adjust the FOV 108 of UAS installed on the UV 104. For instance, a crewmember may initially slew the UAS video left only to discover that the UV 104, and therefore the captured image 124, is orientated opposite of the MOV 102 such that the UAS should be adjusted in a direction opposite with respect to the MOV heading 118b.

Figure 4A:
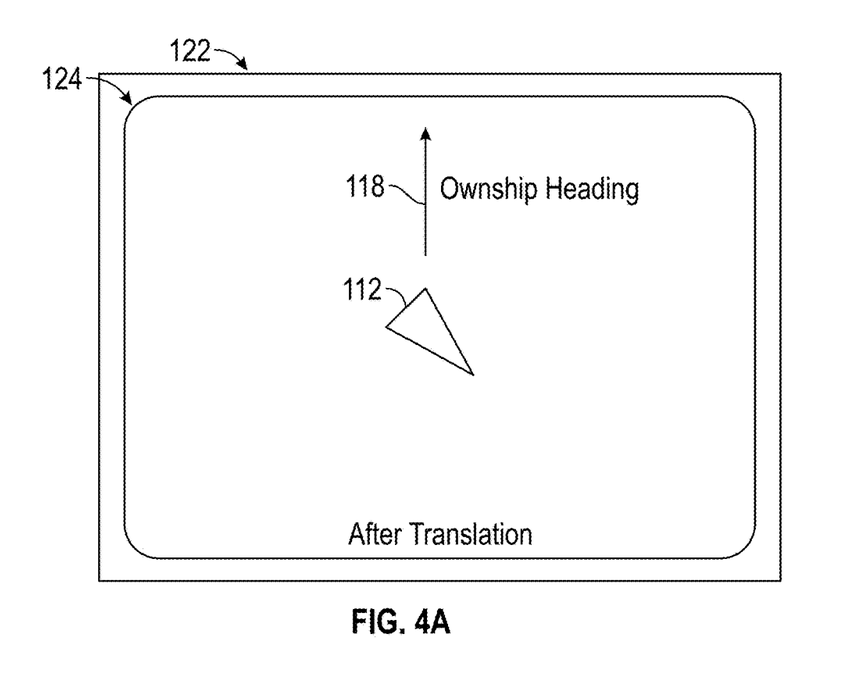
FIGS. 4A-4B illustrate the MFD of FIGS. 3A-3B after performing an image translation which translates the orientation of the video stream with respect to the current ownership heading of the manually operated vehicle.
Figure 4B:
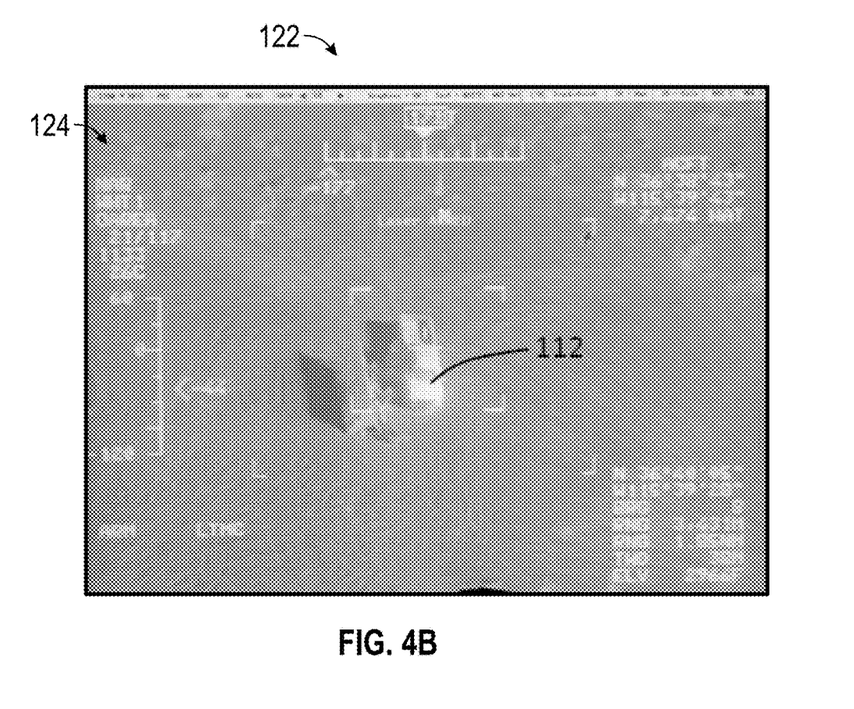

Turning now to FIGS. 4A-4B, the multi-function display (MFD) 122 illustrates the real-time captured image 124 after performing an image orientation transformation according to a non-limiting embodiment. After translating the orientation of the UV 104 with respect to the MOV 102, the orientation of the real-time captured image 124 is transformed and is displayed having a modified orientation that matches the current MOV heading 118, independent of the actual UV flight pattern 114 and current orientation of the UV 104. Moreover, the image transform is continuously applied to the image data transmitted from the UV 104 such that the real-time captured image 124 displayed on the MFD 122 appears substantially stable instead of constantly rotating according to the monitoring path of the UV 104.

Figure 5:
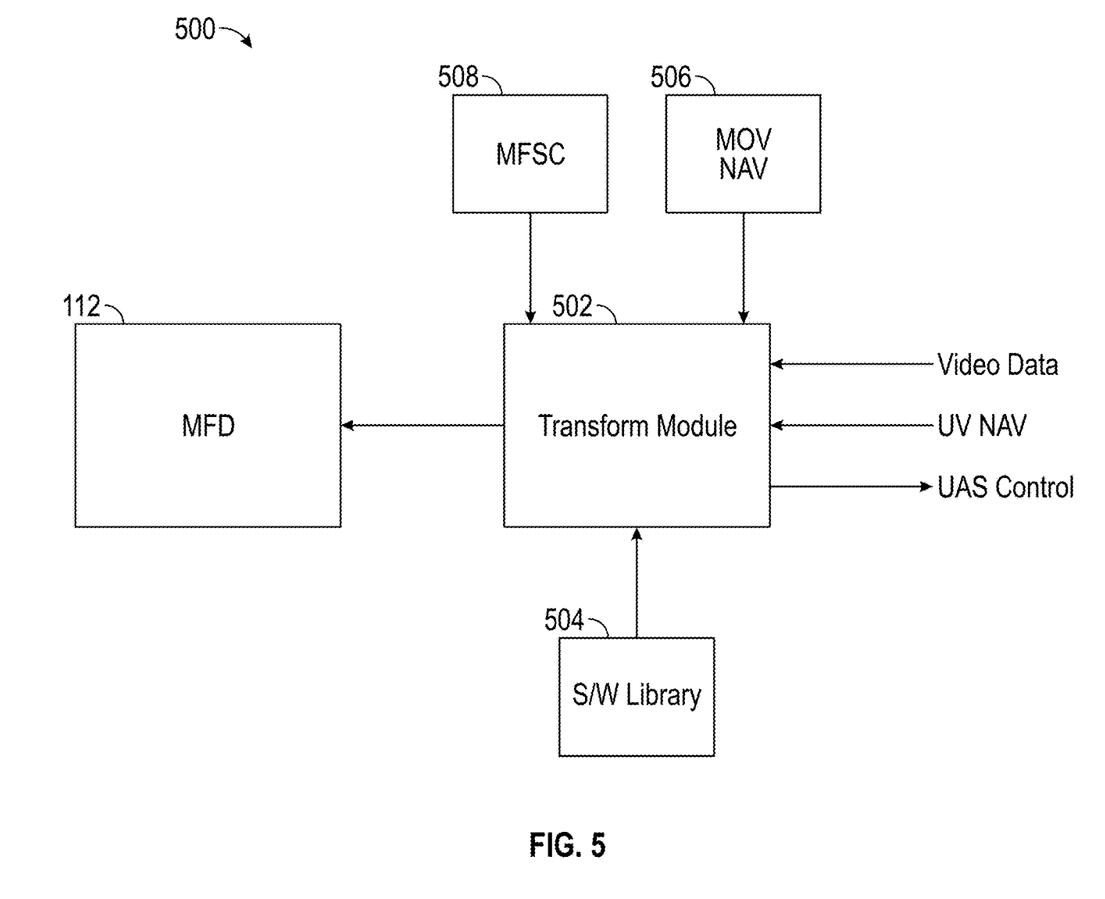
FIG. 5 is a block diagram illustrating an image orientation transform system according to a non-limiting embodiment.

With reference now to FIG. 5, a MUM-T image transform system 500 is illustrated according to a non-limiting embodiment. The MUM-T image transform system 500 includes an electronic image transform module 502 configure to display a transformed real-time image captured by a UV (not shown in FIG. 5) on a MFD 122. According to a non-limiting embodiment, the image transform module 502 is installed on a MOV (not shown in FIG. 5). It should be appreciated, however, that image transform module 502 can exist remotely from the MOV, e.g., in a cloud server, where image processing can be executing. The final image transformed image can then transmitted to the MOV where it is displayed via the MFD 122.

The image transform module 502 is in signal communication with an electronic software library module 504, a MOV navigation module 506, and a UV. The MOV navigation module 506 continuously monitors the current heading and location of the MOV. The MOV current heading and location can be determined using global position satellite (GPS), for example, as understood by one of ordinary skill in the art. The UV wirelessly transmits image data and UV navigation data to the image transform module 502. The image data includes any image data captured in real-time by a UAS installed on the UV. For example, the image data includes real-time streamed video captured by the UAS and wireless transmitted to the UV over an encrypted wireless network. The UV navigation data includes data describing the location and current heading of the UV. For example, the navigation data includes GPS data and the current cardinal directional heading (e.g., north, east, south, west) of the UV.

Based on the video data and the UV navigation data, the image transform module 502 retrieves various algorithms stored in the software library module 504 to transform the actual orientation captured image into a modified orientation that matches the heading of the MOV indicated by data provided by the MOV navigation module 506. The algorithms include, but are not limited to, a Hough transformation, a Scale-invariant feature transformation (SIFT), and Mercator-based projection algorithms. The re-orientated video data is then output to the MFD 124 where it is displayed to crewmembers of the MOV.

In addition to transforming the orientation of the real-time captured image data, the transform module 502 is configured to translate UAS control commands input via a UV input device such as, for example, a Multi Force Slew Controller (MFSC) 508 or directional stick. More specifically, at least one embodiment implements a transformation that enables crewmembers of the MOV to control the orientation of at least one sensor including in a UAS installed on the UV using the MFSC 508. Unlike conventional systems, however, the UAS response is respective to the orientation of the MOV, not the actual orientation and cardinal directional heading of the UV. This may be achieved, for example, by assigning unambiguous directional references to the MOV that are not relative to the observer or cardinal directions. For instance, a MOV can be assigned a "port" side and "starboard" side, which designate left and right sides of the MOV, respectively. As is well understood, the port is the left-hand side of or direction from the UV facing forward, while the starboard is the right-hand side, facing forward. The port and starboard sides are maintained regardless as to the cardinal directional heading of the MOV.

Crewmembers of the MOV may manipulate the MFSC so as to manually slew the UAS video up (UP), down (DN), port side (PS)—i.e., left, and starboard side (SB)—i.e., right, with reference to the port side and starboard sides of the MOV so as to retain the desired mechanical characteristics of the MFSC. The UP and DN slew directions occur along a manually selected orientation, and PS and SB slew directions occur with reference to the port and starboard sides, respectively, and perpendicular to the manually selected UP and DN orientations. Thus, the MFSC 508 can be manipulated to adjust the UAS according to a crewmember's perspective without being concerned with the heading or position of the UV.

The image transform module 502 compares the input direction to a current heading of the MOV. This allows the image transform module 502 to determine if an input to slew the UAS in the PS direction translates to north, east, south, or west of the crewmembers's real-time perspective. The image transform module 502 then performs a second comparison between the translated directional input and a current heading and orientation of the UV. In a scenario where both the MOV and the UV are orientated heading due east, for example, a directional input to slew the UAS in a PS direction will command the UAS sensor to slew in a generally northward direction. Alternatively, if the MOV is heading due east, but the UV is orientated heading due west, a directional input to slew the UAS in a PS direction will command the UAS to slew in a generally southward direction. In the crewmember's perspective, however, the image displayed on the MFD will be slewed port side with respect to the MOV as expected. Thus, the UAS is adjusted independently from a physical direction received at the input device, e.g., independent from physically manipulating an input stick in an eastward direction. Accordingly, intuitive sensor slew control can be achieved to facilitate systematic and efficient reconnaissance of one or more areas of interest.

As described in detail above, at least one embodiment of the invention implements a transformation to the streamed UAS video that is independent of the actual flight pattern and orientation of the UV. In addition, at least one embodiment implements a transformation of UAS input commands that enables the aircrew to adjust the UAS according to the crewmembers' perspective without being concerned with the heading or position of the UV. Accordingly, intuitive sensor slew control can be achieved to facilitate systematic and efficient reconnaissance of one or more areas of interest.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A manned unmanned teaming (MUM-T) image system, comprising:
   an unmanned vehicle (UV) configured to travel in a first heading and including at least one sensor configured to capture at least one image having a first visual orientation pursuant to the first heading, and to generate image data indicative of the at least one image;
   a manned vehicle (MV) in signal communication with the UV and configured to travel in a second heading, the MV comprising:
      an electronic image transformation module configured to receive the image data and to transform the image data into a second orientation different from the first orientation based on the second heading; and
      an electronic display unit configured to receive the transformed image data and to display the at least one image according to the second orientation.

2. The system of claim 1, wherein the display unit displays the at least one image according to the second orientation irrespective of the first heading of the UV.

3. The system of claim 2, wherein the UV generates UV navigation data indicating at least one of a current location and a current heading of the UV, and wherein the image transformation module transforms the image data based on a comparison between the first heading and the second heading.

4. The system of claim 3, wherein the image transformation module continuously transforms the orientation of the at least one image such that the second orientation continuously matches the second heading of the MV.

5. The system of claim 1, wherein the MV includes a UV input device configured to input at least one command to control the at least one sensor, and wherein the image transformation module determines at least one directional input applied to the input device and translates the at least one directional input into a sensor position command that adjusts a position of the at least one sensor based on the second heading of the MV.

6. The system of claim 5, wherein the sensor position command adjusts the at least one sensor independently from a physical direction received by the at least one directional input.

7. The system of claim 6, wherein the at least one directional input includes slew up, slew down, slew port side, and slew starboard side.

8. The system of claim 1, wherein the UV is an unmanned aerial vehicle (UAV).

9. The system of claim 1, wherein the at least one image is a streamed video captured in real-time.

10. An image translation system installed on a manned vehicle (MV), the image translation system comprising:
    a MV navigation system configured to determine a current heading of the MV;

an electronic image transformation module configured to receive image data indicative of at least one image captured in a first orientation by at least one sensor installed on an unmanned vehicle (UV), and to transform the image data into a second orientation corresponding to the current heading of the MV; and an electronic display unit configured to receive the transformed image data and to display the at least one image according to the second orientation.

11. The image translation system of claim 10, further comprising a UV input device configured to input at least one command to control the at least one sensor, and wherein the image transformation module determines at least one directional input applied to the input device and translates the at least one directional input into a sensor position command that adjusts a position of the at least one sensor based on the second heading of the MV.

12. The image translation system of claim 11, wherein the sensor position command adjusts the at least one sensor independently from a physical direction received by the at least one directional input.

13. A method of displaying at least one image captured by an unmanned vehicle (UV), the method comprising:
capturing at least one image having a first orientation using at least one sensor installed on the UV;
determining a first heading of the UV at the time of capturing the at least one image;
generating image data indicative of the at least one image having the first orientation pursuant to the first heading, and transmitting the image data to at least one manned vehicle (MV);
determining a second heading of the MV;
transforming the image data into a second orientation different from the first orientation based on the second heading; and
displaying the at least one image according to the second orientation on an electronic display unit.

14. The method of claim 13, further comprising displaying the at least one image according to the second orientation irrespective of the first heading of the UV.

15. The method of claim 14, further comprising generating UV navigation data indicating at least one of a current location and a current heading of the UV, and transforming the image data based on a comparison between the first heading and the second heading.

16. The method of claim 13, further comprising continuously transforming the orientation of the at least one image such that the second orientation continuously matches the second heading of the MV.

17. The method of claim 15, further comprising inputting at least one command to control the at least one sensor, determining at least one directional input applied to the input device and translating the at least one directional input into a sensor position command so as to adjust a position of the at least one sensor based on the second heading of the MV.

18. The method of claim 17, further comprising adjusting the at least one sensor independently from a direction received by the at least one directional input.

19. The method of claim 18, wherein the at least one directional input includes slew up, slew down, slew port side, and slew starboard side.

20. The method of claim 13, wherein the UV is an unmanned aerial vehicle (UAV), and wherein the at least one image is a streamed video captured in real-time.

* * * * *